C. KOMROSKY.
POTATO CUTTING MACHINE.
APPLICATION FILED JAN. 16, 1918.

1,278,356.

Patented Sept. 10, 1918.
4 SHEETS—SHEET 1.

INVENTOR:
Charles Komrosky,
BY his ATTORNEY:
A. M. Carlsen.

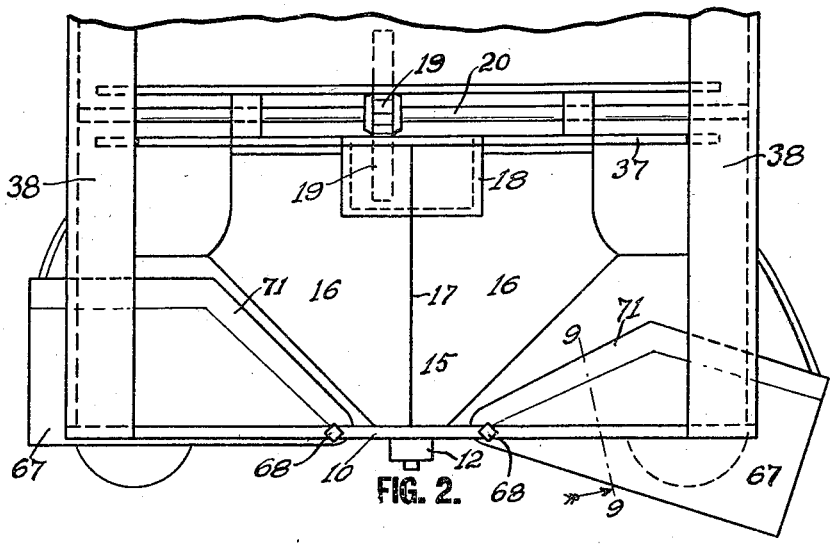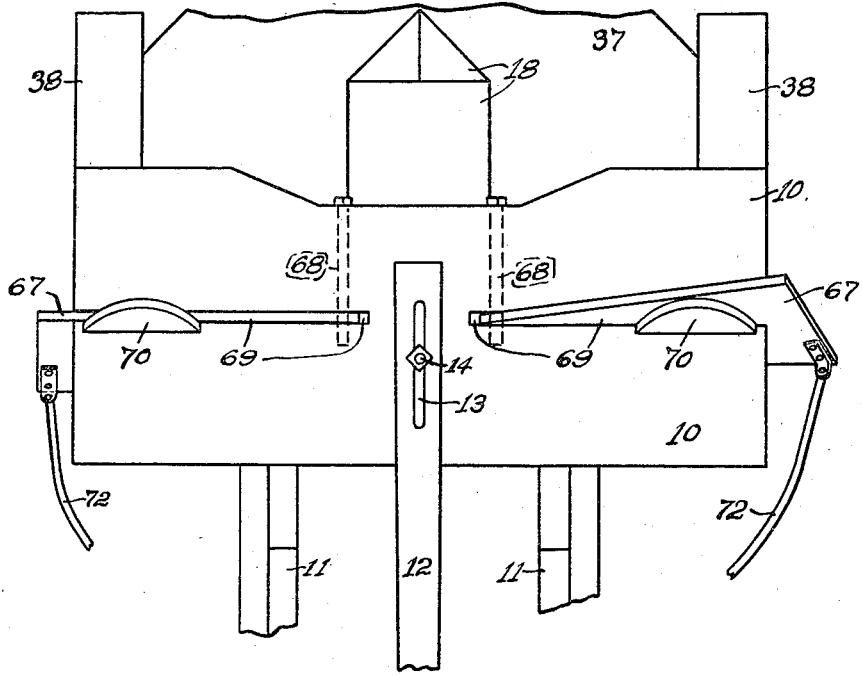

C. KOMROSKY.
POTATO CUTTING MACHINE.
APPLICATION FILED JAN. 16, 1918.

1,278,356.

Patented Sept. 10, 1918.

INVENTOR:
Charles Komrosky,
BY his ATTORNEY
A. M. Carlsen.

C. KOMROSKY.
POTATO CUTTING MACHINE.
APPLICATION FILED JAN. 16, 1918.
1,278,356.
Patented Sept. 10, 1918.
4 SHEETS—SHEET 4.
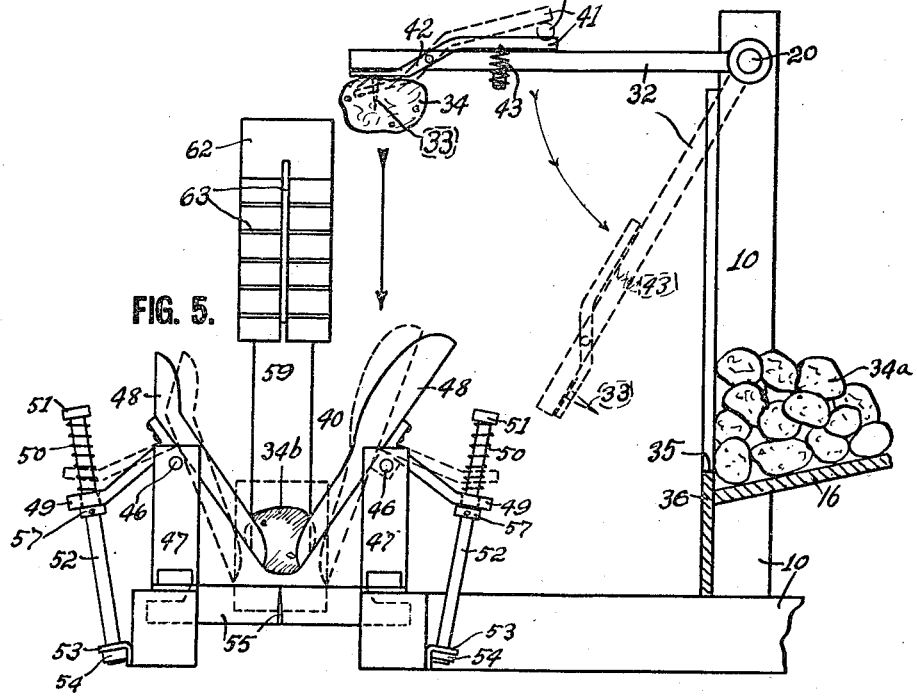
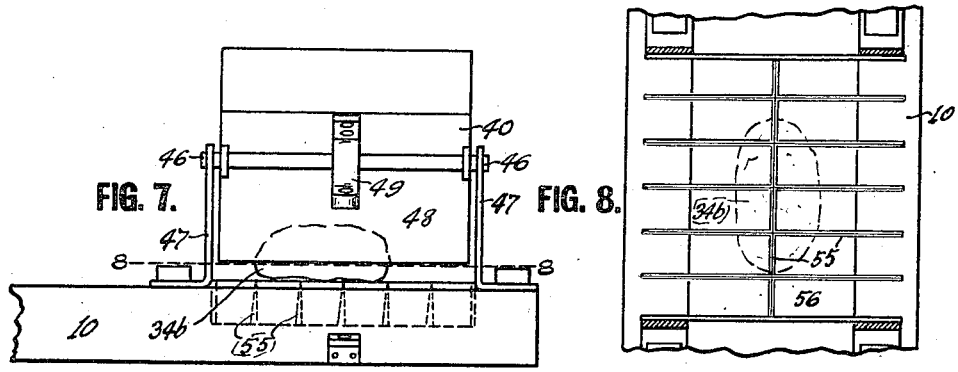
INVENTOR:
Charles Komrosky
BY his ATTORNEY:
A. M. Carlsen

UNITED STATES PATENT OFFICE.

CHARLES KOMROSKY, OF SANBORN, NORTH DAKOTA.

POTATO-CUTTING MACHINE.

1,278,356.     Specification of Letters Patent.   Patented Sept. 10, 1918.

Application filed January 16, 1918. Serial No. 212,132.

*To all whom it may concern:*

Be it known that I, CHARLES KOMROSKY, a citizen of the United States, residing at Sanborn, in the county of Barnes and State of North Dakota, have invented a new and useful Potato-Cutting Machine, of which the following is a specification.

My invention relates to machines for cutting seed potatoes into several parts or pieces preparatory to planting. It is a well known fact that in most instances a potato of the average size is so large that the season it remains in the soil as a seed is not sufficiently long to convey all the vitality of the seed into the new potatoes raised from the original one, and for said reason it is a great wasting of seed potatoes to plant them whole. The potato farmers have therefore long ago resorted to cutting the seed potatoes into two or more pieces, each of which proves to yield as good or even better harvest than a whole potato. But such cutting has been done by a common knife held in the hand, which is a much too slow and expensive process, especially for potato raising on a large scale. The object of my invention, therefore, is to provide a power operated machine by which seed potatoes may be properly cut at the rate of several hundred bushels per day.

In constructing such a machine I provide a potato magazine or main hopper, and one or more smaller hoppers each with a cutting device in it, and arms adapted to carry one potato at a time from the magazine into one of the smaller hoppers, where a presser device pushes each potato down between spaced cutter blades, below which sacks are arranged to receive the cut potatoes.

Figure 1:
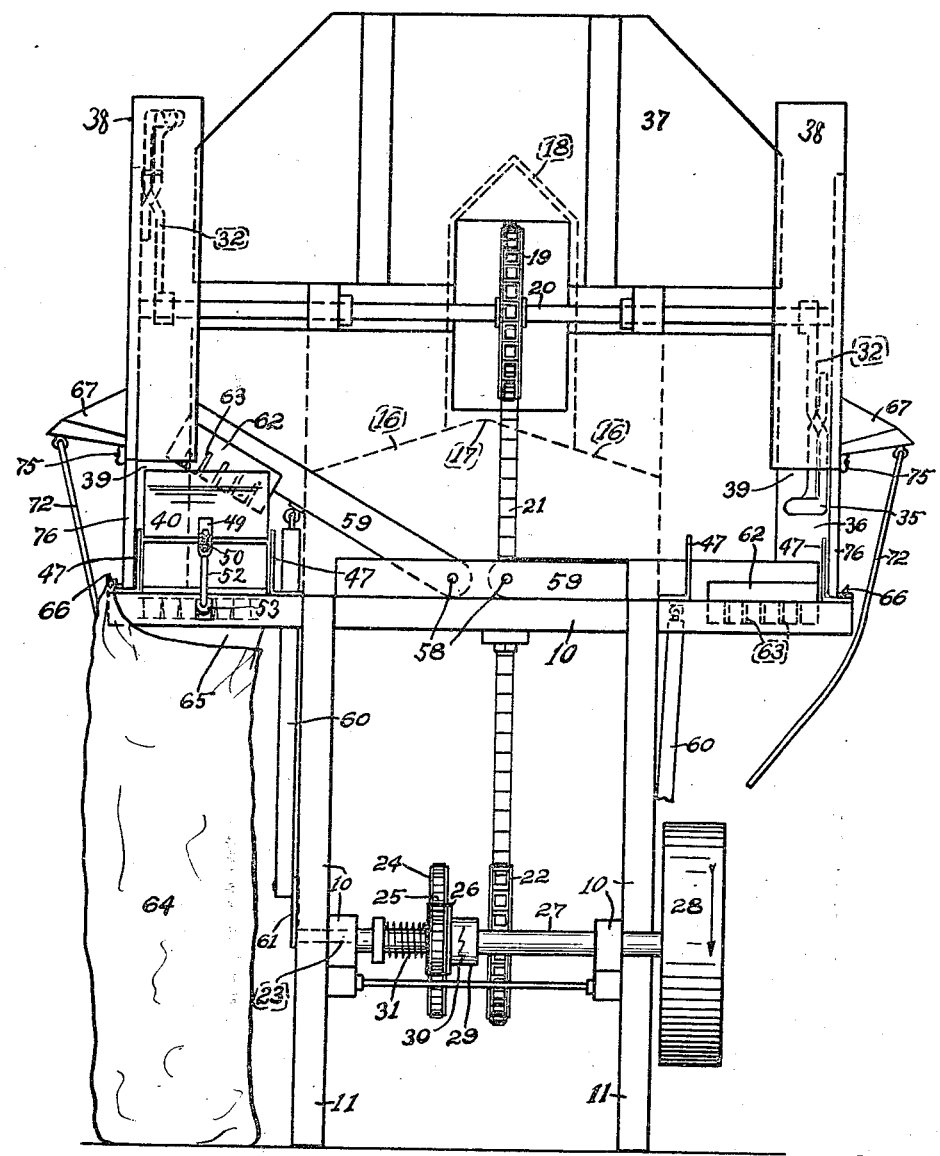
Figure 4:
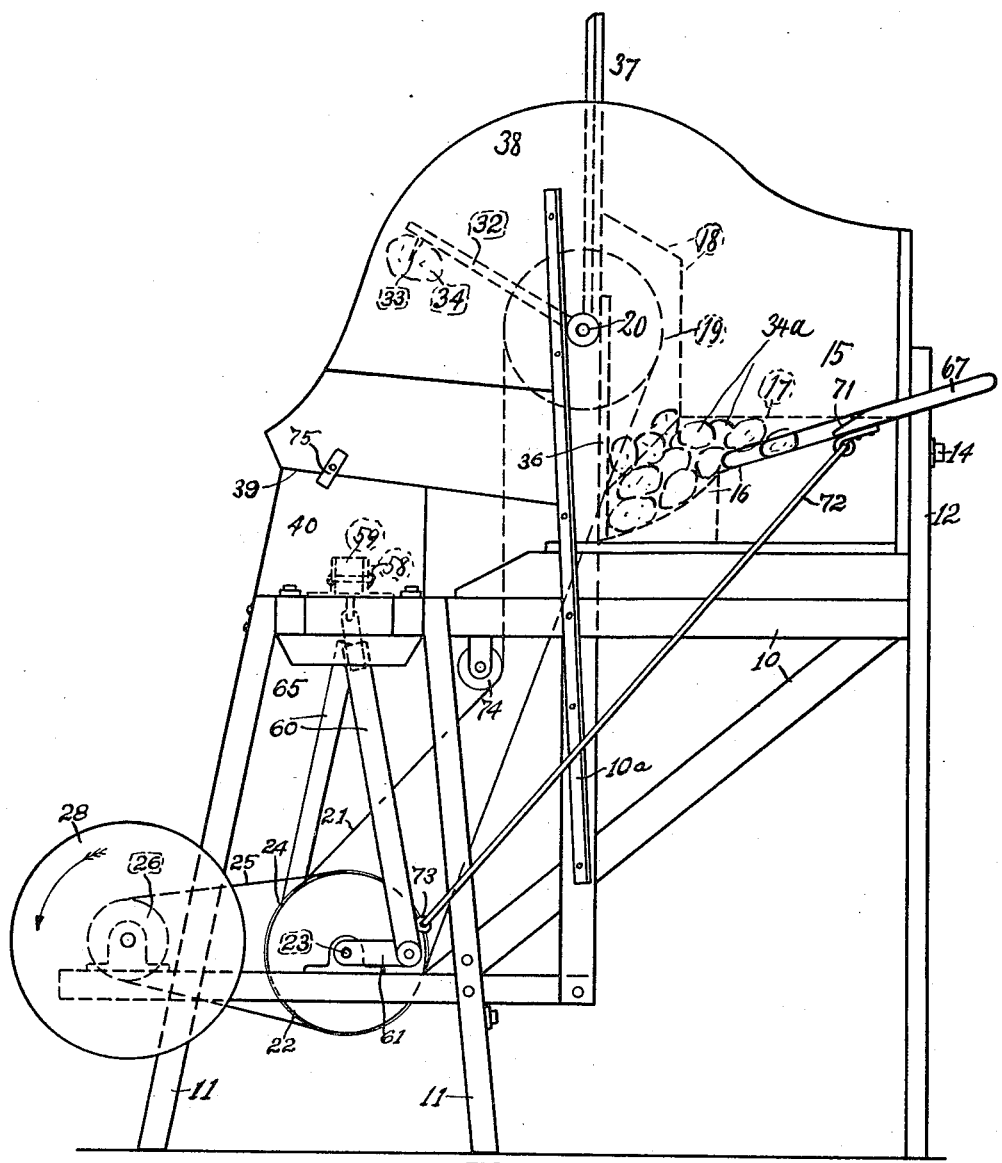

In the accompanying drawings, Figure 1 is a front elevation of my potato cutting machine with the right hand side cutter hopper 40 omitted. Fig. 2 is a top or plan view of as much of the machine as will explain its construction when seen from the top. Fig. 3 is a rear elevation of the upper portion of the machine. Fig. 4 is a side elevation looking from right to left in Fig. 1. Fig. 5 is an enlarged detail view showing more clearly in elevation the potato carrying and cutting mechanism. Fig. 6 is a top view of the potato carrying arm seen near below it in Fig. 5. Fig. 7 is a left hand side view of the cutter hopper at the left in Fig. 5 with some parts omitted. Fig. 8 is a section on the line 8—8 Fig. 7, showing the top of the stationary cutters through which the potatoes are thrust and thereby cut in pieces. Fig. 9 is a detail cross section on the line 9—9 in Fig. 2, of one of the impelling plates 67 in the bottom of the magazine.

Referring to the drawings by reference numerals, 10 designates a suitable frame work supported on legs 11 which serve also as parts of the frame. 12 is a special rear leg or prop, which is vertically adjustable by having a slot 13 with a bolt 14 therethrough into the rear side of the frame. This leg 12 is to support the rearwardly projecting portion of the machine and to make the machine stand steady also if the ground is uneven.

Mounted in the upper part of the machine is a comparatively large hopper or magazine 15, whose bottom 16 inclines downward to both sides from a ridge 17. In said large hopper 18 is a housing for the rear half of a sprocket 19, which is fixed on a shaft 20. Said sprocket is rotated by a link belt 21 from a sprocket 22 which is fixed on a counter shaft 23 journaled in the lower part of the frame and having another fixed sprocket 24 which is driven by a link belt 25 and a sprocket 26. The latter sprocket is loose on a drive shaft 27 having a fixed pulley 28 to which a belt may be applied from any available source of power. Fixed on the drive shaft is a clutch member 29 arranged to engage a clutch member 30 on the hub of the sprocket 26, as long as a spring 31 holds the sprocket toward the fixed clutch members; but if by accident the drive shaft 27 should be rotated in the wrong direction, the spring 31 will yield and allow the clutch member 30 to move longitudinally sufficiently to let the member 29 play idly over the teeth of member 30, and thus avoid damage to the mechanism in the upper part of the machine by operating it in the wrong direction.

Fixed at each end of the shaft 20 is a radial arm 32, (see Figs. 1, 5 and 6) provided near its end with a prong 33 by which to spear and carry from the magazine a potato, as 34, each time the arm swings through a slit 35 (see Figs. 1 and 5) in the front wall 36 of the magazine and through the supply 34ᵃ of potatoes rearward of said board. Farther up is another board or partition 37, which serves to guide the potatoes down into the magazine as they are being shoveled in.

The picker arms, as they may be termed, 32, are arranged in radially opposite directions from the shaft and move each one in a housing 38 which prevents it from injuring the operator or getting hold of his clothes. Said housing is formed with a downward opening 39, through which the carried potato drops into a cutter hopper 40 when released from the prong 33 carrying it. Said release is caused by a stripper lever 41, which is pivoted at 42 on the arm 32 and having one end engaging the potato and the other end held in idle position by a spring 43 until the arm reaches the horizontal position shown in Fig. 5, when a stud 44 fixed in the side wall 45 of the housing causes the stripper 41 to tilt on its pivot and strip the potato off from the prong or picker 33, so it drops into the hopper 40, which latter will now be more fully described.

The two hoppers 40, one at each front corner of the machine, being of like construction, the one to the right in Fig. 1 is not shown and the following description of one of them will serve for both.

Trunnioned at 46 in two pairs of posts 47 are two side members 48 of the hopper. Each member is provided with an arm 49 which is normally impelled downwardly by a spring 50, which is partly compressed by the head 51 of a rod 52 which extends through the spring and through a hole in the arm 49 and has its lower end passed loosely through a bracket 53 on the frame work and retained by a nut 54, as best shown in Fig. 5. The springs 50 thus tend to close the lower parts of the plates or members 48 together against the sides of any size potato dropping to the position shown by the potato 34$^b$, which is centrally upon a set of crossing cutter blades 55 arranged over an opening 56 in the frame (see Fig. 8). In Fig. 5 57 are collars held by set screws so as to regulate the downward action by the springs 50 on the arms 49.

Pivoted at 58 (see Fig. 1) are two arms 59, each of which is connected by a rod 60 to a crank 61 fixed on the counter shaft 23, and arranged in diametrically opposite direction from the center of the shaft so as to operate alternately the arms 59. The latter arms are each provided with a block 62 having crossed grooves 63 serving as clearances for the blades 55 when the block is brought down upon each potato so as to cause it to be cut by the blades and pushed down between them till the pieces drop into a sack 64, which is shown in Fig. 1 to embrace a wide spout 65 and be supported by hooks 66 of which only one is visible in said view, but there may of course be several of them.

In order to impel the potatoes toward the openings 35 with sufficient force to enable the prong 33 to spear each potato, I employ near each side of the magazine an impelling device, which consists of a board 67, which rests flat upon the adjacent portion of the magazine bottom, is pivoted at 68, swings in a slit 69 in the frame, is partly supported by an extension 70 at the rear of the frame, and has its front edge beveled to form an inclined face 71 (see Fig. 9) by which to impel the potatoes toward the picker 33. Each of said impelling plates is operated by a rod 72 extending from the lower end of each rod 60, as shown at 73 in Fig. 4.

In Fig. 4, 10$^a$ is an angle iron bar forming a portion of the frame to stiffen it. 74 is a belt tightener. In Fig. 1 75 are thumb-buttons holding the side boards 76 in a removable manner, to give access into the cutter hoppers when so desired or required.

The operation of the machine is already fairly stated, but it may be recapitulated briefly by saying: The potatoes are shoveled into the magazine, the pulley 28 rotated, the arms 32 will then carry and drop one potato at a time alternately into each cutter hopper, and there the presser blocks 62 will force each potato through the knives or cutters and into the sack or other suitable receptacle; and from said receptacles the cut potato is conveyed to the field and planted.

Having thus described my invention and its operation, what I claim is:

1. In a potato cutting machine and mounted in a suitable frame, a potato magazine, a hopper and a cutting device in it, a driven shaft, a radial carrier arm fixed on the shaft, and means on the arm for engaging and carrying one potato at a time from the magazine to the hopper and means for automatically releasing the potato from the carrier arm when in a position to drop into the hopper.

2. The structure specified in claim 1 together with an impelling device operatively connected with the drive shaft and adapted to impel the potatoes in the magazine toward the path of the radial arm.

3. In a potato cutting machine and mounted in a suitable frame, a potato magazine, a plurality of hoppers with a cutting device in each of them, a rotated shaft, radial arms fixed on the shaft and means on each arm for engaging and carrying one potato at a time from the magazine to one of the hoppers, and means for automatically releasing the potato from each arm when in a position to drop into one of the hoppers.

4. The structure specified in claim 3 with the further improvement that the bottom of the magazine is inclined toward the path of each carrier arm.

5. The structure specified in claim 4 together with a series of impelling members pivoted upon the bottom of the magazine and operatively connected with the drive shaft, so as to swing each one in plane with a portion of the inclined bottom and having each a beveled edge by which to yieldingly impel the potatoes into the path of one of the carrier arms.

6. In a potato cutting machine, a cutting device comprising a series of stationary crossed blades, means for placing the potatoes upon the edge of said blades, an arm pivoted to swing to and from the edges of the blades, means for swinging said arm, a block rigidly secured at the side of the arm approaching the blades, said block having projecting parts adapted to press the potato down between the blades so as to thereby cause it to be cut.

7. The structure specified in claim 6 and automatically operated means for feeding one potato down upon the blades each time the arm swings the block away therefrom.

In testimony whereof I affix my signature.

CHARLES KOMROSKY.

Copies of this patent may be obtained for five cents each, by addressing the "Commissioner of Patents, Washington, D. C."